July 25, 1950     F. G. SCHWEISTHAL     2,516,427
MEASURING DEVICE FOR LUBRICATING SYSTEMS
Filed Jan. 1, 1945
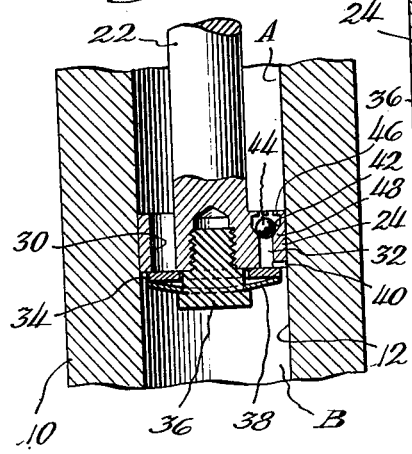
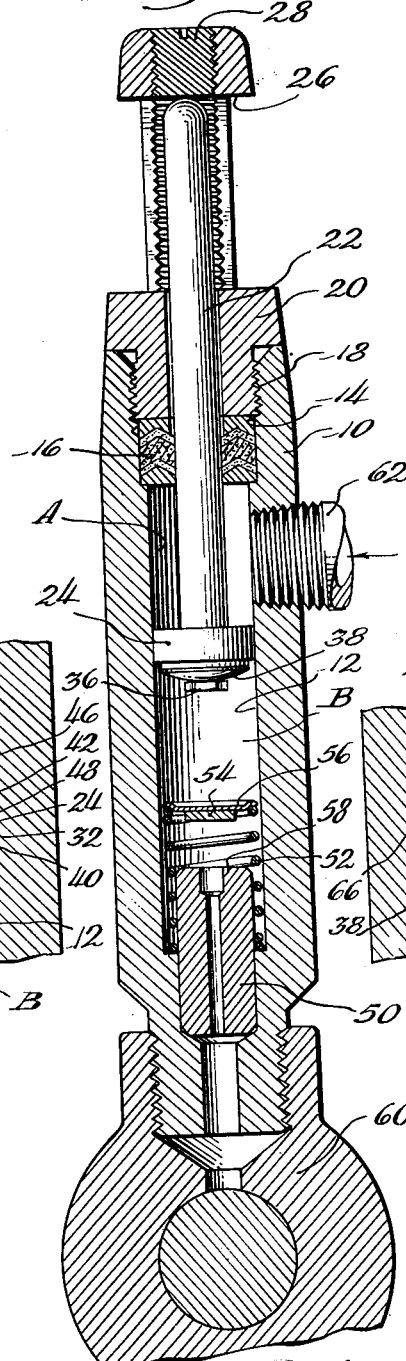
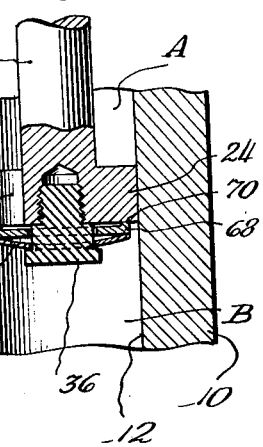
Inventor
Frederick G. Schweisthal
By Williams, Bradbury & Hinkle
attorneys Patented July 25, 1950

2,516,427

UNITED STATES PATENT OFFICE 2,516,427

MEASURING DEVICE FOR LUBRICATING SYSTEMS

Frederick G. Schweisthal, Skokie, Ill., assignor to Stewart-Warner Corporation, Chicago, Ill., a corporation of Virginia Application January 1, 1945, Serial No. 570,961

3 Claims. (Cl. 184—7)

My invention relates generally to lubricating apparatus, and more particularly to lubricant charge measuring devices for use in centralized lubricating systems.

This invention is an improvement upon the measuring device shown in the patent to Teal, No. 2,205,320. In the construction shown in said patent, there was the ever-present possibility that lubricant would bypass the measuring piston if the back pressure, offered by the resistance of the bearing to which the device was connected, became sufficiently high. Under such circumstances, the lubricant flow to the bearing might be at such a low rate that the pressure drop through the passageways of the piston would be insufficient to cause actuation of the piston.

In the measuring device disclosed herein, the passageway through the piston is provided with a spring loaded check valve so that lubricant cannot bypass the piston except when the pressure differential upon the opposite sides thereof exceeds a predetermined minimum value, such value being more than sufficient to cause the piston to execute a complete discharge stroke. However, an additional bypass, of very restricted cross sectional area, is provided so as to assure equalization of the pressure on opposite sides of the piston at the end of the return stroke.

It is therefore an object of my invention to provide an improved measuring device for lubricating systems, which will operate accurately to discharge a measured charge of lubricant even though the resistance to flow of lubricant into the bearing may be extremely high.

A further object is to provide an improved measuring device, for use in centralized lubricating systems, in which the passageway through the measuring piston is provided with a spring loaded check valve.

A further object is to provide an improved measuring device for centralized lubricating systems, which operates more rapidly and positively than comparable prior devices.

Other objects will appear from the following description, reference being had to the accompanying drawings, in which:

Fig. 1 is a central vertical sectional view of the measuring device shown as attached to a bearing to be periodically supplied with a measured charge of lubricant;

Fig. 2 is a central vertical sectional view of the piston, shown to an enlarged scale; and Fig. 3 is a central vertical sectional view of a modified form of piston assembly.

The measuring device comprises a body 10 having a measuring cylinder or bore 12 extending substantially the length thereof, the upper end of the bore 12 being provided with a counterbore 14 for the reception of suitable packing 16 and is threaded at 18 to receive an end cap 20. The latter forms a gland to hold the packing 16 in place, and also serves as a guide for a piston rod 22 which may be secured to or formed integrally with a measuring piston 24 reciprocable in the bore 12. The cap 20 has milled chordal slots 26 to render visible the end of the piston rod 22. An adjustable screw 28 is threaded in the bore formed in the end cap 20, and forms an upper stop to limit the stroke of the piston 24 and thereby adjust for the quantity of lubricant to be discharged upon each operation of the measuring valve.

As best shown in Fig. 2, the piston 24 has a relatively large passageway 30 and a smaller passageway 32 extending therethrough. The lower end of the passageway 30 is normally closed by an annular disc valve 34 which is freely slidable upon a shouldered and headed stud 36. The valve 34 is held against the lower face of the piston 24 by a dished annular spring washer 38.

The passageway 32 is provided with a radial port 40 leading beyond the peripheral edge of the valve 34. The passageway 32 also has an enlarged check valve chamber 42 in which a ball check valve 44 is retained by swaged prongs 46, the check valve cooperating with a seat 48 so as to prevent flow of lubricant downwardly through the passageway 32.

A tubular valve seat member 50 is pressed into the discharge end of the body 10, providing an annular space for the reception of a helical compression coil spring 52. A discharge valve 54, which may be made of a suitable synthetic rubberlike material, resistant to deterioration by immersion in oils and greases, is bonded or otherwise suitably secured to a spring saddle 56. At the end of the downward stroke of the piston 24, the valve 54 is adapted to be pressed against a seating surface 58, located at the end of the valve seat member 50, by the stud 36.

The valve body 10 is illustrated as being threaded in a bearing 60 of conventional construction, while lubricant is supplied to the upper end of the bore 12 through a pipe 62. It will be understood that the pipe 62 is connected to a source of lubricant such as a high pressure pump, which operates intermittently to supply lubricant under high pressure, and that the pressure in pipe 62 is substantially relieved between the intermittent applications of pressure. Any other suitable means for intermittently supplying lubricant under pressure might be employed.

The force applied to the valve 34 by the spring washer 38 is sufficient that the valve 34 will open only when the difference in the pressures on the opposite faces of the piston 24 is sufficient to overcome the force necessary to move the discharge valve to its seat, to cause flow of lubricant into the bearing, and to overcome the frictional forces of the piston 24 in its bore 12 and of the piston rod 22 in its packing 16.

For convenience in description of the operation of the device, that portion of the bore 12 above the piston 24 will be referred to as space A, while that portion of the bore beneath the piston 24 will be referred to as space B.

Assuming that the spaces A and B, as well as the connecting passageways, are completely filled with lubricant, and that the parts are initially in the position shown in Fig. 1, an application of lubricant pressure through the pipe 62 will cause the piston 24 to move downwardly, forcing the lubricant from space B into the bearing 60. As the piston moves downwardly, its stud 36 engages the spring saddle 56 and forces the valve 54 toward its seating surface 58. Thus this valve eventually stops the downward movement of the piston 24 and cuts off the discharge of the lubricant to the bearing.

Assuming continued application of lubricant pressure, the pressure in the space A will increase to a value sufficient to overcome the force of the annular spring 38, whereupon the valve 34 will open and the lubricant will flow through the passageway 30, substantially equalizing the pressures in spaces A and B. It will be understood that when the downward movement of the piston 24 is arrested as the valve 54 is forced against its seat 58, the pressure in the space B may be substantially less than the pressure in space A. Thus the upper surface of valve 34 is subjected to greater pressure than is acting upon its lower surface. Since the force due to this difference in pressure and acting downwardly upon the valve 34 will be sufficient to overcome the force applied by the spring washer 38, the valve 34 will be unseated to an extent sufficient to permit substantial equalization of the pressures in spaces A and B. The valve 34 need not move more than an extremely minute distance from its seat to permit such substantial equalization of the pressure of the lubricant on the opposite sides of the piston 24. In fact, the slightest leakage of lubricant past the valve 34, due to unavoidable imperfections in the valve 34 and its seating surface on the lower face of the piston 24 will be effective in a short time to result in this pressure equalization, and irrespective of the character of the lubricant being used, the pressure within the space B will be raised quickly to be substantially equal to that in the space A. Under these circumstances, the piston will commence moving upwardly due to the greater effective area of the lower face of the piston, since it will be noted that the piston rod 22 is exposed to atmospheric pressure. As a result, the piston will be moved upwardly until its piston rod 22 contacts the adjustable screw 28. When this occurs, the check valve 34 will seat to close the passageway 30, and upon subsequent reduction in the pressure of the lubricant supplied through the pipe 62, the pressure in the space B becomes relatively greater than that in the space A, the pressure in space B being sufficient to hold the valve 54 seated against the force of the spring 52. However, under these circumstances the lubricant flows at a slow rate through the port 40 and passageway 32, past the free check valve 44 and into the space A so as to equalize the pressures in spaces A and B. The pressure in space B is reduced sufficiently to permit the spring 52 to raise the valve 54 from its seat, and the parts of the device are thus returned to normal position, in condition for a subsequent cycle of operation.

In the modified form of piston structure shown in Fig. 3, similar parts have had similar reference characters applied thereto. It will be noted that in this construction the piston 24 has but a single passageway 66, which is normally closed by a valve 68 having a peripheral bead 70. There is in this instance sufficient clearance between the valve 68 and the stud 36 to provide a restricted passageway for the flow of lubricant from space B to space A, which takes place at the end of the operating cycle as the piston reaches the upper end of its stroke. This passageway permits equalization of the pressure in the spaces A and B so that the pressure in the space B may drop sufficiently to permit the valve 54 to open.

The piston construction of Fig. 3 is not as positive as that of Figs. 1 and 2, in that under extreme conditions, such as when the lubricant used is a heavy grease, and when the temperature is very low while the bearing resistance is very high, there may be some bypass of lubricant through the passageway 66. The passageway provided by the clearance between the valve 68 and stud 36, makes it possible for some lubricant to leak to the bearing without causing the piston 24 to commence its downward stroke. The clearance between the valve 68 and stud 36 should, therefore, be sufficiently small that such bypass of lubricant would not be at a sufficiently high rate to interfere materially with the accuracy of the measured charge.

The measuring device incorporating a piston of the construction shown in Fig. 3, operates in the same manner as the device of Figs. 1 and 2, except for the possibility, pointed out above, that some leakage of lubricant may take place under adverse conditions of use, whereas the structure of Figs. 1 and 2 is such that there can be no appreciable leakage past the piston while the discharge valve 54 is open.

In centralized lubricating systems employing the measuring device disclosed herein, the devices may be connected to the pressure source in any desired arrangement of piping, since each unit will, upon the increase in pressure from the lubricant source, operate independently of the other devices, and as long as the lubricant pressure is applied for a sufficient length of time to permit all of the devices to operate, no misoperation of the devices is possible. Due to the fact that the passageways 30 and 66 may be made relatively large, the return stroke of the piston will be much more rapid than in prior devices where the resistance offered by the passageway through the piston constituted the sole means for building up the differential of pressure on the opposite sides of the piston necessary to assure the downward stroke of the piston. Furthermore, it will be noted that the resistance to admission of lubricant to the bearing cannot affect the operation of the device of Figs. 1 and 2 as long as the pressure applied from the source of lubricant under pressure is sufficient to overcome such bearing resistance. Even with the construction shown in Fig. 3, there will be no leakage unless the forces opposing downward movement of the piston are substantially as great as the force tending to cause such downward movement.

While I have shown and described particular embodiments of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. A measuring device for use in a lubricating system in which lubricant is intermittently supplied under pressure comprising, a body having a cylindrical bore with a lubricant inlet at one end of the bore and a lubricant outlet at the other end of the bore, and a piston structure slidable in said bore between said inlet and said outlet, said piston structure including a piston rod providing differential effective piston areas acted upon by lubricant under pressure in said bore to move said piston structure first in one direction and then in the other direction, said piston rod having its end projecting from said body and exposed to atmospheric pressure, said piston structure having a relatively large passageway and a relatively restricted passageway therethrough, a spring pressed check valve operative to prevent flow from the inlet to the outlet side of the piston structure except when a predetermined differential pressure on the opposite sides of the piston is exceeded, and a second check valve in said relatively restricted passageway operable to prevent flow from the inlet to the outlet side of the piston structure, but to permit restricted flow in the opposite direction.

2. A measuring device for use in a centralized lubricating system in which lubricant is intermittently supplied under pressure comprising, a body having a cylindrical bore with a lubricant inlet at one end of the bore, a valve seat forming a lubricant outlet at the other end of said bore, a valve cooperable with said seat, means normally holding said valve away from said seat, a piston reciprocable in said bore, said piston having a pair of passageways extending therethrough and having a piston rod extending from the end of said body adjacent the inlet port, a loaded check valve for preventing flow of lubricant through one of said passageways in a direction from the outlet to the inlet and preventing flow in the opposite direction unless there exists a predetermined pressure differential on the opposite sides of said piston, and a check valve in the other of said passageways operable to prevent flow of lubricant from the inlet to the outlet side of said piston but permitting relatively free flow in the opposite direction.

3. A measuring device for use in a lubricating system in which lubricant is intermittently supplied under pressure comprising, a body having a cylindrical bore with a lubricant inlet at one end of the bore and a lubricant outlet at the other end of the bore, and a piston structure slidable in said bore between said inlet and said outlet, said piston structure including a piston and a piston rod connected thereto providing differential effective piston areas acted upon by lubricant under pressure in said bore to move said piston structure first in one direction and then in the other direction, said piston rod having its end projecting from said body and exposed to atmospheric pressure, said piston having a relatively large passageway and a relatively restricted passageway therethrough, a spring loaded check valve operative to permit flow of lubricant through the large passageway from the inlet side to the outlet side of the piston when a predetermined pressure differential on the opposite sides of the piston is exceeded, and a second check valve operable to prevent flow from the inlet to the outlet side of the piston through the relatively restricted passageway, but to permit sufficient flow of lubricant in the opposite direction that the pressures on the opposite sides of the piston may be substantially equalized whenever the lubricant pressure on the outlet side of the piston exceeds that of the lubricant on the inlet side of the piston.

FREDERICK G. SCHWEISTHAL.

REFERENCES CITED

The following references are of record in the file of this patent:

UNITED STATES PATENTS

| Number | Name | Date |
| --- | --- | --- |
| 1,630,841 | Fusch | May 31, 1927 |
| 2,205,320 | Teal | June 18, 1940 |